United States Patent [19]

Takahashi

[11] Patent Number: 5,226,072
[45] Date of Patent: Jul. 6, 1993

[54] FACSIMILE MACHINE HAVING RECORDING/REPRODUCING APPARATUS

[75] Inventor: Masakatsu Takahashi, Atsugi, Japan

[73] Assignee: Ricoh Company, Ltd., Tokyo, Japan

[21] Appl. No.: 610,770

[22] Filed: Nov. 8, 1990

[30] Foreign Application Priority Data

Nov. 10, 1989 [JP] Japan .................. 1-291072

[51] Int. Cl.[5] ............... H04M 1/65; H04M 11/00
[52] U.S. Cl. .................... 379/67; 379/82; 379/100
[58] Field of Search ............. 379/100, 88, 67, 70, 379/79, 82

[56] References Cited

U.S. PATENT DOCUMENTS

| | | | |
|---|---|---|---|
| 4,856,049 | 8/1989 | Streck | 379/67 |
| 4,868,865 | 9/1989 | Ogawa et al. | 379/100 |
| 4,901,343 | 2/1990 | Yamaguchi | 379/93 |
| 4,932,048 | 6/1990 | Kenmochi et al. | 379/67 |
| 5,014,296 | 5/1991 | Saigano | 379/67 |
| 5,036,534 | 7/1991 | Gural | 379/67 |
| 5,086,455 | 2/1992 | Satomi et al. | 379/100 |

Primary Examiner—Thomas W. Brown
Attorney, Agent, or Firm—Oblon, Spivak, McClelland, Maier & Neustadt

[57] ABSTRACT

A facsimile machine includes a telephone set, a facsimile information processor for processing facsimile information which is to be transmitted to a party device via a communication line and facsimile information which is received via the communication line, and a first switch for selectively coupling the facsimile information processor and the communication line. The facsimile machine also includes a direct-current source for supplying a direct current to the telephone set, and a voice message recording apparatus for recording a voice message input via the telephone set. Further, the facsimile machine includes a second switch for coupling the telephone set to the direct-current source when the voice message input via the telephone set is recorded on the voice message recording apparatus and for alternatively coupling the telephone set to the communication line in a state where the telephone set is disconnected from the direct-current source.

15 Claims, 5 Drawing Sheets

FACSIMILE MACHINE HAVING RECORDING/REPRODUCING APPARATUS

BACKGROUND OF THE INVENTION

The present invention relates to a facsimile machine, and more particularly to a facsimile machine which has a recording/reproducing apparatus for recording and reproducing a sound message and a telephone set.

For example, in a conventional facsimile machine of the above-mentioned type, when a call receiver receives a signal from a call sender, it transmits to the call sender a sound message "Wait for a moment if you want to make a telephone conversation". Then, the call receiver transmits a facsimile signal to the call sender. Thereafter, if the call receiver does not receive from the call sender a response to the transmitted facsimile signal, the call receiver controls the facsimile machine to ring the bell of the telephone set provided therein. When the telephone set on the call receiver's side is off-hooked, the facsimile machine of the call receiver's side switches the line from a facsimile line to a telephone line provided therein. This function enables the receiver to communicate with the call sender either via a facsimile line or via a telephone line, depending on the call sender's choice.

In addition to the functions of a facsimile machine as mentioned above, in some facsimile machines an operator can optionally record the sound message and/or reproduce the message for confirmation purpose. Further, a recording microphone or a loudspeaker may be provided on a facsimile machine. In this case, the microphone or loudspeaker is not for common use with the other parts or accessories. It is either provided in a machine respectively, or a handset for a telephone conversation is used. Accordingly, the respective arrangement of the microphone and loudspeaker in the machine results in a problem that such an arrangement increases the cost because these parts and accessories require additional amplifier circuits and control devices.

Further, in the case of the facsimile machine using a handset for a telephone conversation, the handset is not directly connected to the telephone line but is connected thereto via a signaling circuit within the facsimile machine. Therefore, a problem occurs when the power is broken down in the facsimile machine, because the handset cannot be used for a telephone conversation in that case.

SUMMARY OF THE INVENTION

Accordingly, it is a general object of the present invention to provide a novel and useful facsimile machine in which the problems described in connection with the prior arts are eliminated.

Another and more specific object of the present invention is to provide a facsimile machine in which a message recording/reproducing function can utilize the other parts and circuits provided in the facsimile machine, thereby reducing the cost for the facsimile machine, and in which a conversation can be made anytime regardless of the power supply to the facsimile machine and a telephone set can be used independently of the facsimile machine.

The above-mentioned objects of the present invention are achieved by a facsimile machine which comprises a telephone set and facsimile information processing means for processing facsimile information which is to be transmitted to a party device via a communication line and facsimile information which is received via the communication line. A first switch means selectively couples the facsimile information processing means and the communication line and a direct-current source supplies a direct current to the telephone set. A voice message recording means, coupled to the telephone set, records a voice message input via the telephone set and a second switch couples the telephone set to the direct-current source in order to record the voice message input via the telephone set on the voice message recording means and alternatively couples the telephone set to the communication line in a state where the telephone set is disconnected from the direct-current source.

The aforementioned objects of the present invention are also achieved by a facsimile machine which comprises a telephone set and facsimile information processing means for processing facsimile information which is to be transmitted to a party device via a communication line and facsimile information which is received via the communication line. A first switch means selectively couples the facsimile information processing means and the communication line and a direct-current source supplies a direct current to the telephone set. A voice message reproducing means, coupled to the telephone set and coupled between the first switch means and the facsimile information processing means, outputs a recorded voice message via the telephone set and outputs the recorded voice message to the communication line via the first switch means. A second switch means couples the telephone set to the direct-current source in order to reproduce the recorded voice message output by the voice message reproducing means via the telephone set and alternatively couples the telephone set to the communication line in a state where the telephone set is disconnected from the direct-current source.

The aforementioned objects of the present invention are also achieved by a facsimile machine which comprises a telephone set and facsimile information processing means for processing facsimile information which is to be transmitted to a party device via a communication line and facsimile information which is received via the communication line. A first switch means selectively couples the facsimile information processing means and the communication line and a direct-current source means supplies a direct current to the telephone set. A voice message recording/reproducing means, coupled to the telephone set and coupled between the first switch means and the facsimile information processing means, records a voice message input via the telephone set and outputs the voice message via the telephone set and the communication line via the first switch means. A second switch means couples the telephone set to the direct-current source when the voice message recording/reproducing means records or reproduces the voice message and alternatively couples the telephone set to the communication line in a state where the telephone set is disconnected from the direct-current source.

DESCRIPTION OF THE PREFERRED EMBODIMENTS

A description will now be given of a facsimile machine according to a first preferred embodiment of the present invention with reference to FIG. 1.

Figure 1:
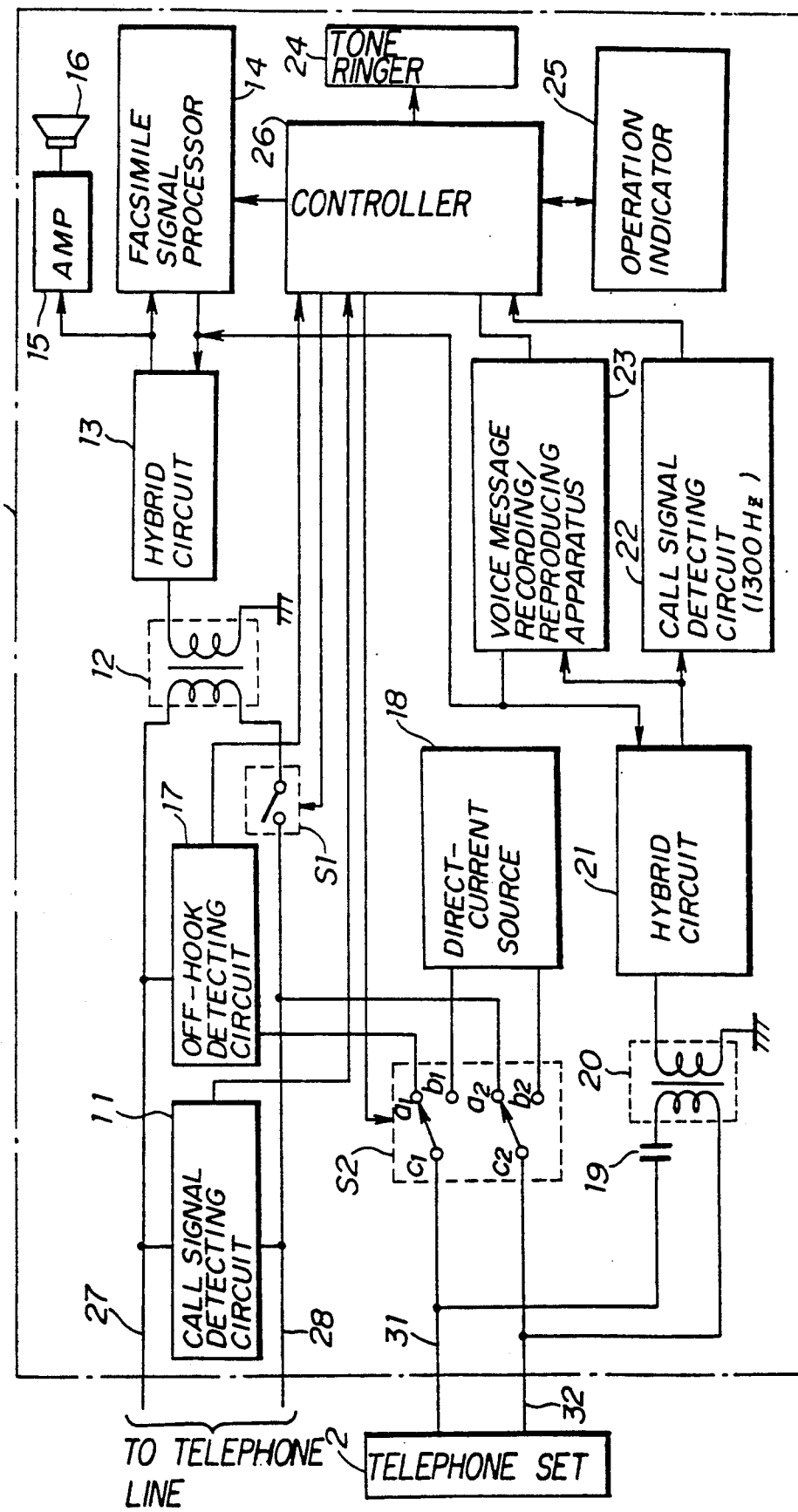
FIG. 1 is a block diagram of a facsimile machine according to a first embodiment of the present invention.

Referring to FIG. 1, a facsimile machine 1 is connected to a telephone line composed of a pair of wires 27 and 28. A telephone set 2 is provided outside of a main frame (body) of the facsimile machine 1. The wire 27 is connected to a call signal detecting circuit 11, which detects a call signal having a frequency of 16 Hz in a telephone network. A coupling transformer 12 has a first coil and a second coil magnetically coupled to each other. The wire 27 is connected to one end of the first coil of the coupling transformer 12. The wire 28 is connected to the other end of the first coil of the coupling transformer 12 via a switch S1.

A hybrid circuit 13 has an interface between a two-wire line and a four-wire line. The two-wire line of the hybrid circuit 13 is connected to the second coil of the coupling transformer. The four-wire line is bidirectional, and coupled to a facsimile signal processor 14. That is, two wires of the four-wire line (only one wire is illustrated for the sake of simplicity) are connected to an input of the facsimile signal processor 14, and the remaining two wires thereof (only one wire is illustrated for the sake of simplicity) are connected to an output of the facsimile signal processor 14. An amplifier 15 coupled to a speaker 16 is connected to the two wires of the four-wire line connected to the input of the facsimile signal processor 14.

The facsimile signal processor 14 optically reads out an original and generates a corresponding electrical signal (facsimile information) which is to be transmitted. The facsimile signal processor 14 records an image defined by a facsimile signal received via the telephone line on a recording media, such as paper. The amplifier 15 amplifies a line signal received via the telephone line and outputs it through a speaker 16 as an acoustic sound.

Two lines of the telephone set 2 are connected to common terminals $c_1$ and $c_2$ respectively of a switch S2. A contact point $a_1$ of the switch S2 is connected to the wire 27 of the telephone lines via an off-hook detecting circuit 17. A contact point $a_2$ of the switch S2 is connected to the other wire 28 of the telephone line. The off-hook detecting circuit 17 detects an off-hook of the telephone set 2. Contact points $b_1$ and $b_2$ of the switch S2 are connected to a direct-current source 18. The direct current source 18 supplies a predetermined direct-current necessary to drive the telephone set 2 in the event that the telephone set 2 is separated from the two-wire telephone line.

The two-wire line extending from the telephone set 2 has wires 31 and 32. The wire 31 is connected to the common terminal $c_1$ and is also connected to one end of a first coil of a coupling transformer 20 via a capacitor 19 for blocking the direct current. The other wire 32 is connected to the common terminal $c_2$ and is also connected to the other end of the first coil of the coupling transformer 20. The coupling transformer 20 has a second coil. One end of the coupling transformer 20 is grounded, and the other end thereof is connected to a two-wire line input of a hybrid circuit 21. The hybrid circuit 21 also has a two-wire input and a two-wire output. The two-wire output of the hybrid circuit 21 is connected to an input of a call signal detecting circuit 22, which detects a call signal of 1300 Hz when this machine receives a facsimile signal via the switch S2, the coupling transformer 20 and the hybrid circuit 21. The two-wire output of the hybrid circuit 21 is also connected to an input of a voice message recording/reproducing apparatus 23.

The sound recording/reproducing apparatus 23 records and reproduces a sound or voice message. A voice message generated by the telephone set 2 is recorded on the voice message recording/reproducing apparatus 23 via the coupling transformer 2 and the hybrid circuit 21, as will be described later. The voice message recording/reproducing apparatus 23 has a two-wire output, which is connected to a two-wire input of the hybrid circuit 21 and the two-wire input terminal of the hybrid circuit 13. The recorded message is output to the telephone set 2 via the hybrid circuit 21 and the coupling transformer 20, and output to the telephone line via the hybrid circuit 13 and the coupling transformer 12.

Under the control of a controller 26, a tone ringer 24 outputs a tone for calling an operator in case the other party is found to use a telephone set at the reception of a call. An operation indicator 25 indicates the operating state of the facsimile machine 1 so that the operator can manipulate the machine while seeing the indicator 25.

To the controller 26, a call detecting signal from the call signal detecting circuit 11 and an off-hook detecting signal from the off-hook detecting circuit 17 are inputted. The controller 26 controls the facsimile signal processor 14, switches S1 and S2, voice message recording/reproducing apparatus 23, tone ringer 24 and so on, thereby carrying out the specific operations of the facsimile machine 1.

According t the above-described construction, in the facsimile machine 1 of the present invention, the switch S1 is in off state when it is in a waiting state without performing any operation. At this time, the movable contact point $c_1$ of the switch S2 is connected to the contact point $a_1$ and the movable contact point $c_2$ is connected to the contact point $a_2$. In this situation, the telephone set 2 is connected to the telephone lines and the operator can use it as a normal telephone set.

Now in order to carry out a facsimile communication, it is necessary to record in advance a voice message to be transmitted at the reception of a call. In this case, the operator first pushes a recording button (not shown for the sake of simplicity) provided on the operation indicator 25 and then inputs a desired voice message via a handset by off-hooking the telephone set 2. This voice message is to be sent when the other party is found to attempt a telephone conversation instead of a facsimile communication at the reception of a call. Therefore it is, for example, "Please wait for a moment. The line is being switched to a telephone line."

Figure 2:
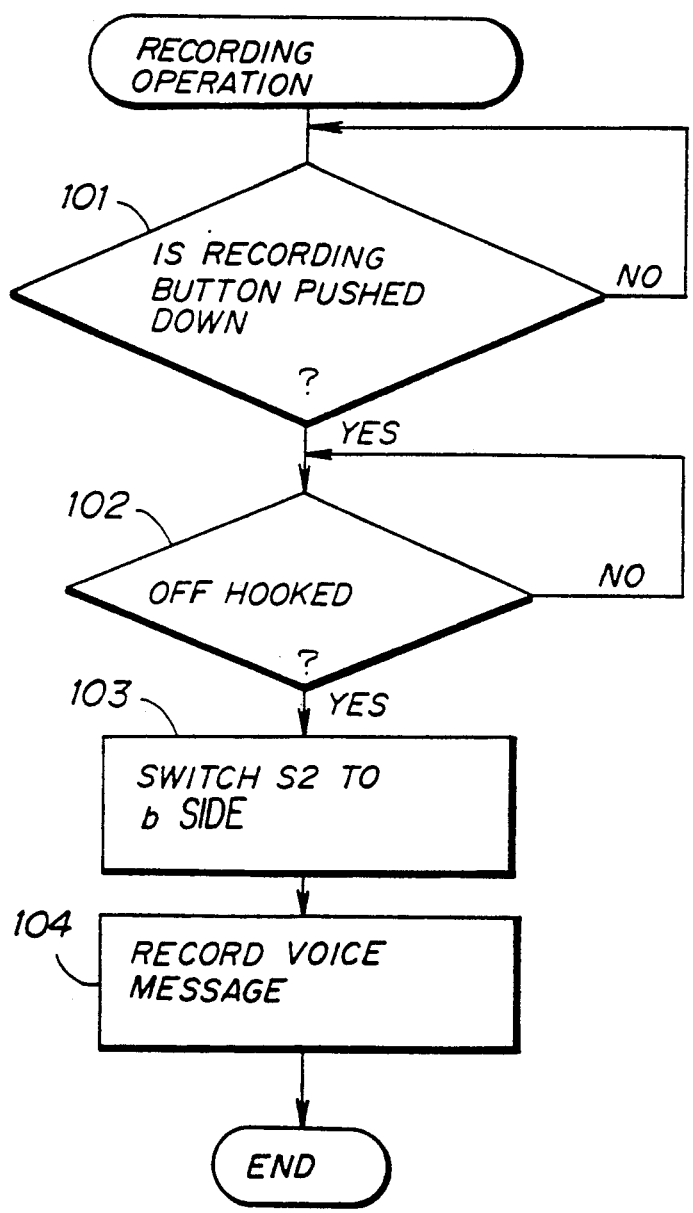
FIG. 2 is a flow chart showing an operation of the recording of a sound message in a facsimile machine according to a first embodiment of the present invention.

Then, a case where an operator records a voice message is described. FIG. 2 shows a flow chart of the operation when the facsimile machine 1 is recording a voice message. When a recording button (not shown) of the operation indicator 2 of the facsimile machine 1 is pushed down in step 101, the off-hook detecting circuit 17 monitors an off-hook of the telephone set 2 in step 102. When it is determined, in step 102, that the telephone set 2 is off-hooked, a call detecting signal outputted from the off-hook detecting circuit 17 is delivered to the controller 26, which then switches the movable contacts $c_1$ and $c_2$ to the side of b (step 103).

This causes a power from the direct current source 18 to be supplied to the telephone set 2. A voice signal from the operator is inputted from the telephone set 2 to the voice message recording/reproducing apparatus 23 via the coupling transformer 20 and hybrid circuit 21. The voice message recording/reproducing apparatus 23 records a voice signal inputted for a certain period of time (step 104).

Figure 3:
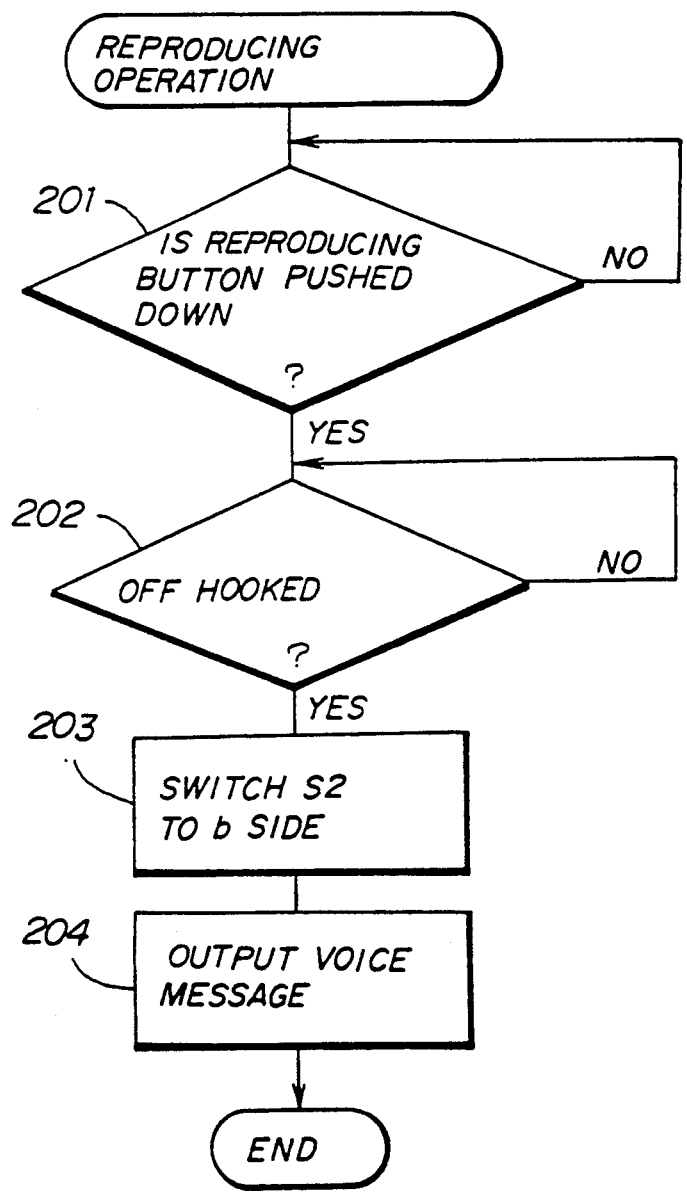
FIG. 3 is a flow chart showing an operation of the reproducing of a sound message in a facsimile machine according to a first embodiment of the present invention.

A case where the operator reproduces for confirmation purpose the voice message which has been recorded in the above-described steps is further described below. FIG. 3 shows a flow chart of an operation when reproducing the voice message. In the facsimile machine 1, a reproducing button (not shown) on the operational indicator 25 is pushed down (step 201), the off-hook detecting circuit 17 monitors an off-hook of the telephone set 2 (the N loop in step 202). Then if off-hooked (Y in step 202), a call detecting signal outputted from the off-hook detecting circuit 17 is fed to the controller 26, which then switches the movable contacts of the switch S2 to the side of b (step 203). The voice message recording/reproducing apparatus 23 then outputs a voice message signal of the recording message (step 204). The voice message signal is inputted to the telephone set 2 via the hybrid circuit 21 and coupling transformer 20. This enables the operator to listen to the voice message through the handset of the telephone set 2.

Figure 4:
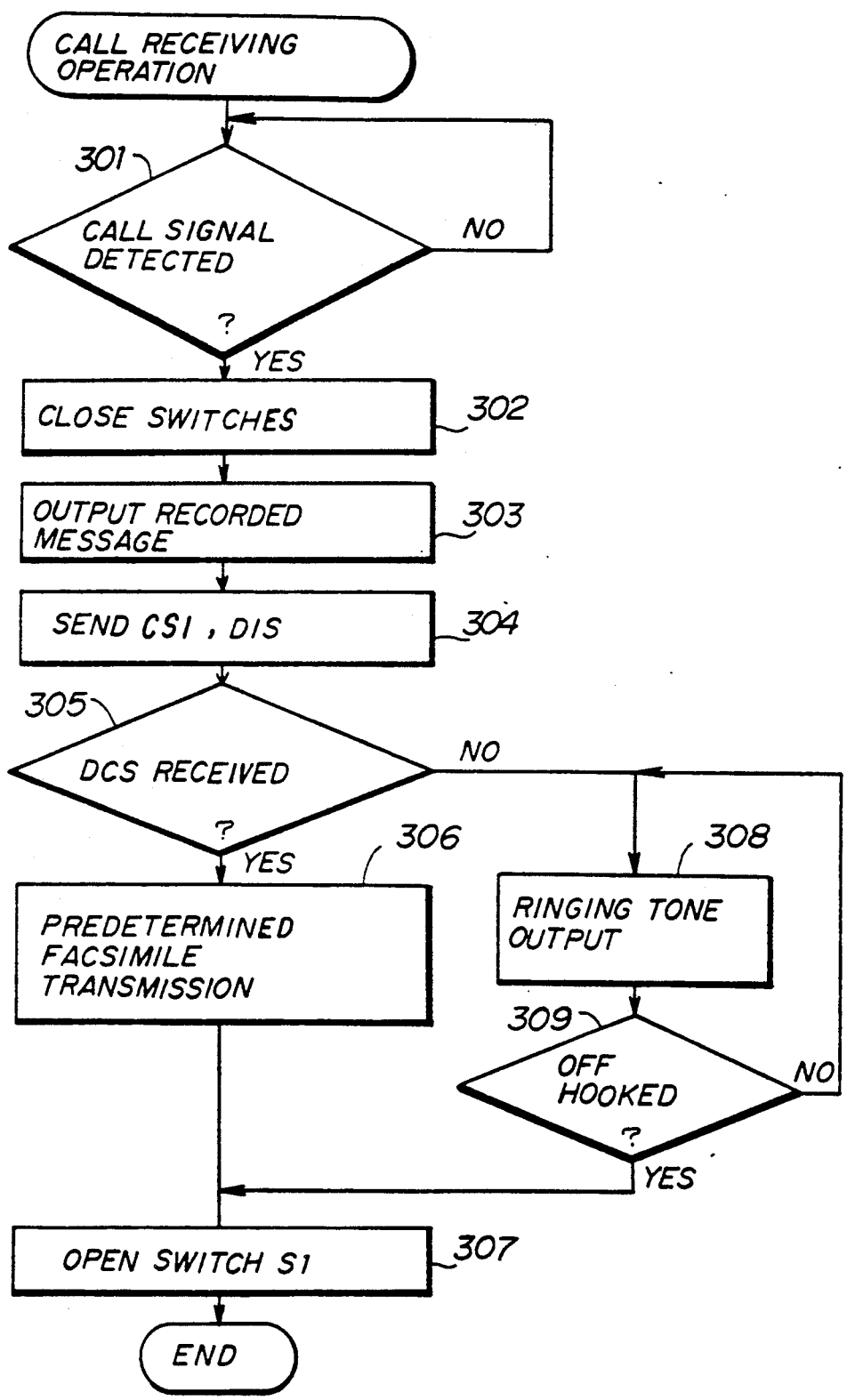
FIG. 4 is a flow chart showing an operation at the reception of a call according to a first embodiment of the present invention.

Further, the description of the receiving operation of the facsimile machine is given in FIG. 4. During its waiting time, the facsimile machine 1 monitors a call signal from the lines by way of the call detecting circuit 22. When it detects a call detecting signal at the call detecting circuit 22, the signal is delivered to the controller 26 (Y of step 301), which then makes the switch S1 in an on state (step 302). Thereafter, the voice message recording/reproducing apparatus 23 outputs a voice message signal of the recorded message. At this time, the voice message signal is outputted to the telephone lines via the hybrid circuit 13 and coupling transformer 12 (step 303).

Then the facsimile machine 1 transmits to the sender's side "Called Station Identification (CSI) Signal, Digital Identification Signal (DIS)" which is a sequence signal of a transmission control sequence for a facsimile communication (step 304). Thereafter, the facsimile machine 1 at the receiver's side monitors the reception of "Digital Command Signal (DCS)" or the like which is a kind of a response signal for a certain period of time (step 305).

At this stage, if the facsimile machine 1 receives from the other end the Digital Command Signal which is a response signal, the transmission is made through a facsimile line. And if a response signal is not received, it is a transmission through a telephone set 2.

If the call signal detecting circuit 22 of the facsimile machine 1 receives from the other end Digital Command Signal which is a response signal (Y of step 305), it performs a facsimile communication by way of the specific transmission control sequence (step 306). At this time the transmission signal is amplified in the amplifier 15 and a signal is outputted from the monitor speaker 16 as a tone to monitor the transmission condition. The call signal detecting circuit 22 of the facsimile machine at the receiver's end receives a termination signal, and when the transmission is completed, the termination signal is delivered from the call signal detecting circuit 22 to the controller 26. Then the controller 22 puts the switch S1 in an on state (step 307).

On the other hand, if a sender transmits from the telephone 2, a response signal of the above-described Digital Command Signal is not received at the facsimile machine 1. In this case (N of step 305), the tone ringer 24 of the facsimile machine 1 outputs a ringing tone informing a reception to call the operator (step 308), and further monitors an off-hook of the telephone set 2 (step 309, 308). The tone ringer 24 outputs the ringing tone until an off-hook takes place. If the telephone set 2 is off-hooked by the operator (Y of step 309), the off-hook detecting circuit 17 detects the off-hook and delivers it to the controller 26. The controller 26 puts the switch S1 in an off state (step 307). In this state the operator can carry out a conversation with the other end.

As described above, in this embodiment the telephone set 2 is directly connected to the telephone lines when the facsimile machine 1 is not operated. This enables the telephone set 2 to be used for a conversation as usual even if the facsimile machine 1 cannot be used because of, for example, a power failure.

The coupling transformer 20, hybrid circuit 21, call signal detecting circuit 22 etc. are the circuits of those kinds which have conventionally been provided to detect a call signal in a facsimile network. In this embodiment, the coupling transformer 20 and the hybrid circuit 21 are chosen from the conventional type circuits to connect the telephone set 2 to the voice message recording/reproducing apparatus 23 so that voice messages can be recorded and reproduced. These arrangements eliminate the need of a dedicated microphone or loudspeaker for the facsimile machine 1 and also reduce the number of the circuits to be newly provided, thereby reducing the costs required for the arrangement.

Further, in this embodiment the switch S1 is in an off state when the facsimile machine 1 is not in operation, and is in an on state when the call signal detecting circuit 11 detects a call signal from the lines. In addition, the switch S1 is in an on state during a facsimile communication, and becomes in an off state when the communication is ended. The switch S2 separates the telephone set 2 from the lines and then the direct current source 18 supplies power to the telephone set 2. This switching can make the construction of the circuit simple.

Figure 5:
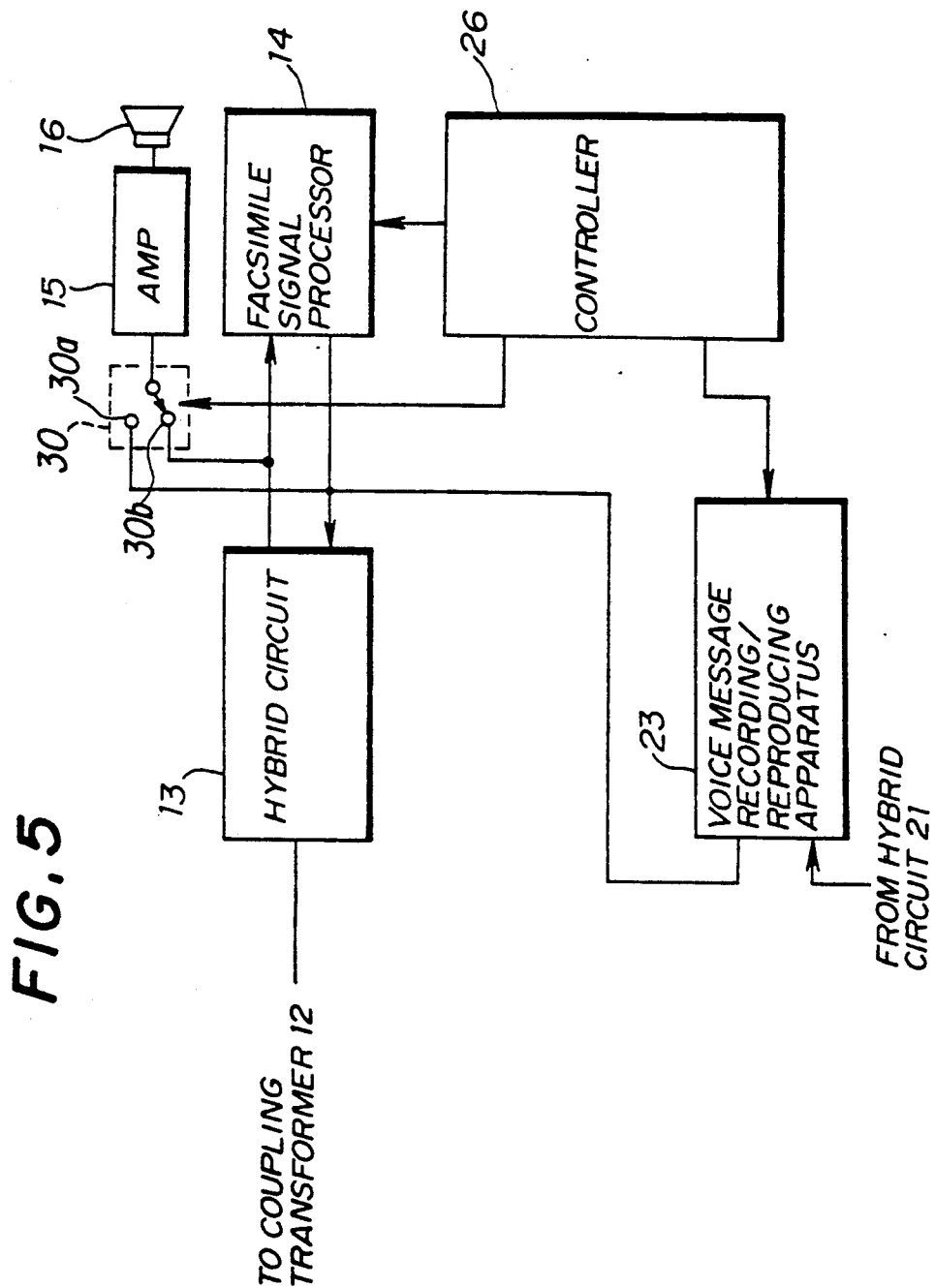
FIG. 5 is a block diagram of a facsimile machine according to a second embodiment of the present invention.

Then a second embodiment according to the present invention is described. FIG. 5 shows a construction of the second embodiment. This drawing illustrates those parts which have a different construction from FIG. 1. In the first embodiment, the monitoring speaker 16 was used for outputting a transmission signal when a response signal was received from the other end. However, in the present embodiment, to use each circuit in the facsimile machine 1 more effectively and advantageously, a switch 30 is provided which switches between the state where the input signal of the amplifier 15 is responded and where a voice message is outputted.

This switch 30 switches between a transmission signal of a facsimile communication and a sound signal from the voice message recording/reproducing apparatus 23. When the switch 30 is switched to the side of 30a, a voice message signal is inputted to the amplifier 15, and the recorded voice message is outputted from the monitoring speaker 16.

If the switch 30 is switched to the side of 30b, a transmission signal is inputted to the amplifier 15, and it is outputted from the monitoring speaker 16 as a tone.

Because of this, the voice message recorded using the telephone set 2 can be reproduced and outputted through the amplifier 15 and speaker 16 without off-hooking the telephone set 2.

As described above, because the facsimile machine 1 according to the present invention directly connects the telephone set 2 to the telephone lines when the machine is not in operation, a conversation can be made anytime regardless of the power coming to the machine. In addition, the facsimile machine 1 according to the present invention can use the telephone set 2 provided on the facsimile machine 1 as a microphone and loudspeaker for recording and reproducing.

Further, the telephone set 2 and the recording/reproducing apparatus 23 are connected to each other utilizing the hybrid circuit 21 which is used in the call signal detecting circuit 22 for a facsimile network. This results in a reduced number of signaling circuits which should be newly provided.

The present invention is not limited to these embodiments, but various variations and modifications may be made without departing from the scope of the present invention.

What is claimed is:

1. A facsimile machine comprising:
   a telephone set;
   facsimile information processing means for processing facsimile information which is to be transmitted to a party device via a communication line and facsimile information which is received via said communication line;
   first switch means for selectively coupling said facsimile information processing means and said communication line;
   direct-current source means for supplying a direct current to said telephone set;
   voice message recording means, coupled to said telephone set, for recording a voice message input via said telephone set; and
   second switch means for coupling said telephone set to said direct-current source means in order to record said voice message input via said telephone set on said voice message recording means and for alternatively coupling said telephone set to said communication line in a state where said telephone set is disconnected from said direct current source means.

2. A facsimile machine as claimed in claim 1, further comprising:
   off-hook detecting means for detecting an off-hooked state of said telephone set; and
   control means for controlling said second switch means so that said second switch means disconnects said telephone set from said communication line and couples said telephone set to said voice message recording means when said off-hook detecting means detects the off-hooked state of said telephone set.

3. A facsimile machine as claimed in claim 1, further comprising:
   call signal detecting means for detecting a call signal via said communication line; and
   control means for controlling said first switch means so that said first switch means couples said facsimile information processing means to said communication line when said call signal detecting means detects said call signal.

4. A facsimile machine as claimed in claim 3, further comprising means for determining whether or not a predetermined answer signal is received via said communication line and for controlling said facsimile information processing means so that said facsimile information processing means processes facsimile information to be sent to said communication line when it is determined that said predetermined answer signal has been received.

5. A facsimile machine as claimed in claim 3, further comprising means for determining whether or not a predetermined answer signal is received via said communication line and for controlling said first switch means so that said first switch means disconnects said facsimile information processing machine from said communication line when it is determined that said predetermined answer signal is not received.

6. A facsimile machine as claimed in claim 1, further comprising hybrid circuit means for coupling said telephone set and said voice message recording means.

7. A facsimile machine comprising:
   a telephone set;
   facsimile information processing means for processing facsimile information which is to be transmitted to a party device via a communication line and facsimile information which is received via said communication line;
   first switch means for selectively coupling said facsimile information processing means and said communication line;
   direct-current source means for supplying a direct current to said telephone set;
   voice message reproducing means, coupled to said telephone set and coupled between said first switch means and said facsimile information processing means, for outputting a recorded voice message via said telephone set and for outputting said recorded voice message to said communication line via said first switch means; and
   second switch means for coupling said telephone set to said direct-current source means in order to reproduce said recorded voice message output by said voice message reproducing means via said telephone set and for alternatively coupling said telephone set to said communication line in a state where said telephone set is disconnected from said direct-current source means.

8. A facsimile machine as claimed in claim 7, further comprising hybrid circuit means for electrically coupling said voice message reproducing means and said first switch means so that said recorded voice message is prevented from being input to said facsimile information processing means.

9. A facsimile machine as claimed in claim 7, further comprising:
   off-hook detecting means for detecting an off-hooked state of said telephone set; and
   control means for controlling said second switch means so that said second switch means disconnects said telephone set from said communication line and couples said telephone set to said voice message reproducing means when said off-hook detecting means detects the off-hooked state of said telephone set.

10. A facsimile machine as claimed in claim 7, further comprising:
   selector means for selecting either said recorded voice message output by said voice message reproducing means or a signal transmitted via said communication line;
   speaker means, coupled to said selector means, for outputting an acoustic signal formed either by said recorded voice message or by said signal selected by said selector means.

11. A facsimile machine as claimed in claim 7, further comprising:
   call signal detecting means for detecting a call signal via said communication line; and
   control means for controlling said first switch means so that said first switch means couples said facsimile information processing means to said communication line when said call signal detecting means detects said call signal.

12. A facsimile machine as claimed in claim 11, further comprising means for determining whether or not a predetermined answer signal is received via said communication line and for controlling said facsimile information processing means so that said facsimile information processing means processes facsimile information to be sent to said communication line when it is determined that said predetermined answer signal has been received.

13. A facsimile machine as claimed in claim 11, further comprising means for determining whether or not a predetermined answer signal is received via said communication line and for controlling said first switch means so that said first switch means disconnects said facsimile information processing means from said communication line when it is determined that said predetermined answer signal is not received.

14. A facsimile machine as claimed in claim 7, further comprising hybrid circuit means for coupling said telephone set and said voice message reproducing means.

15. A facsimile machine comprising:
   a telephone set;
   facsimile information processing means for processing facsimile information which is to be transmitted to a party device via a communication line and facsimile information which is received via said communication line;
   first switch means for selectively coupling said facsimile information processing means and said communication line;
   direct-current source means for supplying a direct current to said telephone set;
   voice message recording/reproducing means, coupled to said telephone set and coupled between said first switch means and said facsimile information processing means, for recording a voice message input via said telephone set and for outputting said voice message via said telephone set and for outputting said voice message to said communication line via said first switch means; and
   second switch means for coupling said telephone set to said direct-current source means in order to record or reproduce said voice message via said telephone set and for alternatively coupling said telephone set to said communication line in a state where said telephone set is disconnected from said direct-current source means.

* * * * *